(12) United States Patent
Hirukawa (10) Patent No.: US 7,988,226 B2
(45) Date of Patent: Aug. 2, 2011

(54) REFLECTOR SUPPORT STRUCTURE

(75) Inventor: Masayuki Hirukawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 309 days.

(21) Appl. No.: 12/200,232

(22) Filed: Aug. 28, 2008

(65) Prior Publication Data

US 2009/0057509 A1 Mar. 5, 2009

(30) Foreign Application Priority Data

Aug. 31, 2007 (JP) ................................ 2007-226442

(51) Int. Cl.
*B60J 7/00* (2006.01)

(52) U.S. Cl. ....................................................... 296/198

(58) Field of Classification Search .................. 296/198, 296/191; 362/549, 341, 514, 516, 308; 280/288.4, 280/851; 343/912; 116/28 R; 313/113, 313/114

See application file for complete search history.

(56) References Cited

U.S. PATENT DOCUMENTS

| | | | | |
|---|---|---|---|---|
| 4,449,602 | A * | 5/1984 | Dittmann, Jr. ................. | 180/215 |
| 6,779,620 | B2 * | 8/2004 | Taniguchi et al. ............. | 180/219 |
| 6,793,384 | B2 * | 9/2004 | Ban et al. ....................... | 362/473 |
| 7,008,087 | B2 * | 3/2006 | Takahashi ...................... | 362/473 |
| 7,090,235 | B2 * | 8/2006 | Takemura et al. ......... | 280/152.2 |
| 7,134,706 | B2 * | 11/2006 | Michisaka et al. ......... | 296/97.22 |
| 7,182,494 | B2 * | 2/2007 | Nakayama et al. ........... | 362/545 |
| 7,232,014 | B2 * | 6/2007 | Nakaie .......................... | 188/71.1 |
| 7,234,559 | B2 * | 6/2007 | Nakano et al. ................ | 180/219 |
| 7,298,241 | B2 * | 11/2007 | Konno et al. ................ | 340/5.64 |
| 7,410,191 | B2 * | 8/2008 | Karube et al. ................ | 280/833 |
| 7,416,046 | B2 * | 8/2008 | Aube et al. ..................... | 180/312 |
| 7,517,122 | B2 * | 4/2009 | Kurihara ........................ | 362/514 |
| 7,581,615 | B2 * | 9/2009 | Karube et al. ................ | 180/309 |
| 7,661,857 | B2 * | 2/2010 | Ohzono ......................... | 362/473 |
| 7,740,100 | B2 * | 6/2010 | Takahashi et al. ............ | 180/311 |
| 7,798,509 | B2 * | 9/2010 | Ohzono ...................... | 280/152.05 |
| 2003/0221891 | A1 * | 12/2003 | Fecteau et al. ................ | 180/210 |
| 2007/0240924 | A1 * | 10/2007 | Kurihara ....................... | 180/219 |
| 2008/0169134 | A1 * | 7/2008 | Tomolillo et al. ............ | 180/6.24 |
| 2008/0179486 | A1 * | 7/2008 | Russell et al. ................ | 248/479 |
| 2009/0057509 | A1 * | 3/2009 | Hirukawa .................. | 248/205.1 |
| 2009/0185388 | A1 * | 7/2009 | Kageyama .................... | 362/473 |
| 2009/0196056 | A1 * | 8/2009 | Kageyama .................... | 362/473 |

FOREIGN PATENT DOCUMENTS

JP 2006-96132 A 4/2006

* cited by examiner

*Primary Examiner* — Kiran B. Patel
(74) *Attorney, Agent, or Firm* — Birch, Stewart, Kolasch & Birch, LLP (57) ABSTRACT

A reflector support structure capable of reducing the effect on the appearance of a vehicle body, while maintaining good visibility. In a vehicle including a wheel disposed on a vehicle body frame via a suspension, a fender covering an upward area of the wheel, a cross frame disposed on an inside of the fender and extending laterally across the vehicle body frame, and a shock absorber having an upper end attached to the cross frame, a reflector is disposed visibly from an outside of the vehicle body on the cross frame disposed on the inside of the fender.

10 Claims, 6 Drawing Sheets

REFLECTOR SUPPORT STRUCTURE

CROSS-REFERENCE TO RELATED APPLICATIONS

The present application claims priority under 35 USC 119 to Japanese Patent Application No. 2007-226442 filed on Aug. 31, 2007 the entire contents of which are hereby incorporated by reference.

BACKGROUND OF THE INVENTION

1. Field of the Invention

The present invention relates to a reflector support structure for mounting a reflector so as to be visible from the outside of a vehicle body.

2. Description of Background Art

Saddle-riding type vehicles including ATVs (all terrain vehicles) (hereinafter referred to as "vehicle") are known. See, for example, Japanese Patent Laid-Open No. 2006-096132. Such a vehicle is attached with a reflector for the improved visibility from the outside. Typically, the reflector is mounted on a rear carrier and designed to reflect light when illuminated from the rear of the vehicle. Some countries require that the reflector is mounted on a side surface of the vehicle.

Because the mounting of the reflector on the side of the vehicle affects the appearance of the vehicle body, it is not preferable to mount the reflector on the side surface of a vehicle main body. It is likely that a reflector mounted on a carrier will be a hindrance to cargo to be loaded on the carrier.

SUMMARY AND OBJECTS OF THE INVENTION

The present invention has been made to solve the foregoing problem and it is an object of an embodiment of the present invention to provide a reflector support structure capable of reducing the effect on the appearance of the vehicle body, while maintaining good visibility.

To achieve the foregoing object, a reflector support structure according to an embodiment of the present invention includes a wheel, a fender, a cross frame, and a shock absorber. More specifically, the wheel is disposed on a vehicle body frame via a suspension. The fender covers an upward area of the wheel. The cross frame is disposed on an inside of the fender and extends laterally across the vehicle body frame. The shock absorber has an upper end attached to the cross frame. In this vehicle, a reflector is disposed visibly from an outside of the vehicle body on the cross frame disposed on the inside of the fender.

In this arrangement, the reflector disposed on the inside of the fender helps minimize the effect on the appearance, while maintaining good visibility.

In the foregoing arrangement, preferably the fender has a side surface open in a wheel width direction such that the reflector is visible from the outside of the vehicle body.

This arrangement eliminates the possibility that the reflector is covered by the side surface of the fender.

In the foregoing arrangement, preferably the fender has a front surface open in a wheel longitudinal direction such that the reflector is visible from the outside of the vehicle body.

This arrangement eliminates the possibility that the reflector is covered by the front surface of the fender.

In accordance with an embodiment of the present invention, the reflector is disposed on the cross frame disposed on the inside of the fender so as to be visible from the outside of the vehicle body. The effect on the appearance can be minimized while maintaining visibility by disposing the reflector inside the fender. As a result, the effect on the vehicle appearance because of a noticeable reflector can be lessened.

The fender has the side surface that is open in the wheel width direction such that the reflector is visible from the outside of the vehicle body. This ensures that the reflector is visible from a side of the vehicle body without being covered by the side surface of the fender.

Further, the fender has the front surface that is open in the wheel longitudinal direction such that the reflector is visible from the outside of the vehicle body. This ensures that the reflector is visible from the front of the vehicle body without being covered by the front surface of the fender.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A specific embodiment to which the present invention is applied will be described below with reference to the accompanying drawings. Throughout the descriptions given hereunder, longitudinal, lateral, and vertical directions are relative to the vehicle body. In the drawings, an arrow FR denotes a vehicle forward direction, an arrow R denotes a vehicle rightward direction, and an arrow UP denotes a vehicle upward direction, respectively.

Figure 1:
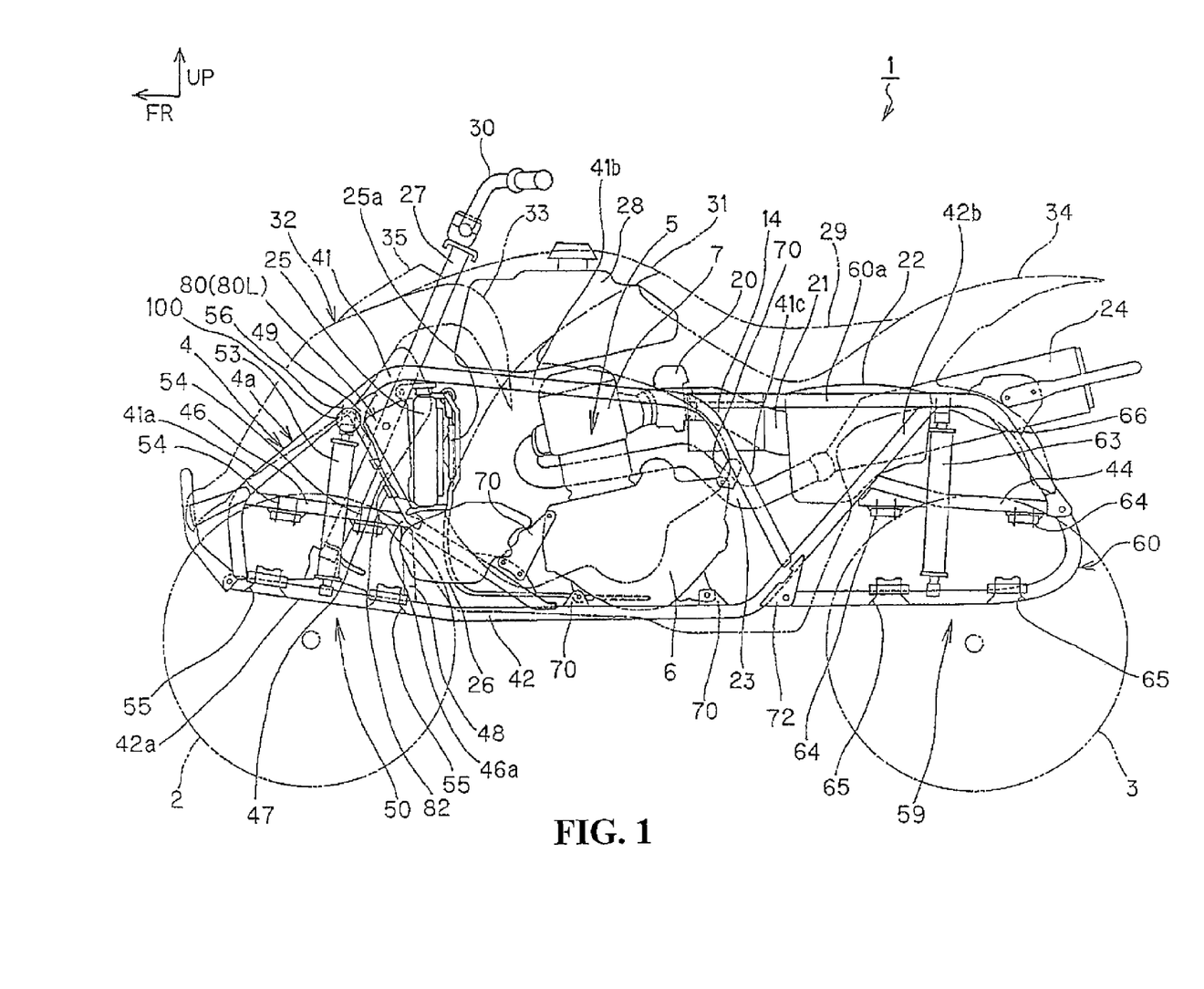
FIG. 1 is a side elevational view showing a saddle-riding type vehicle according to an embodiment of the present invention.
Figure 2:
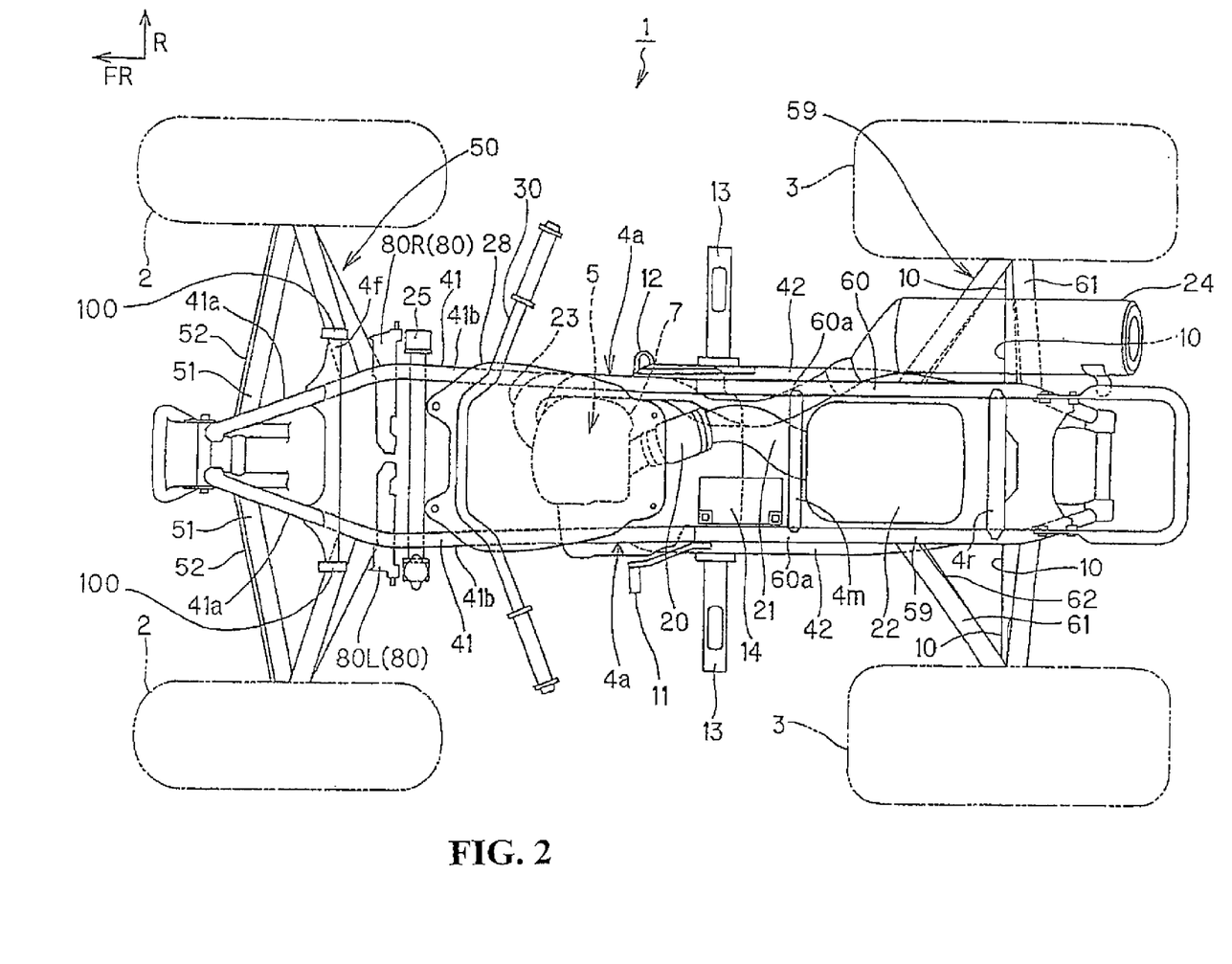
FIG. 2 is a plan view showing the saddle-riding type vehicle according to the embodiment of the present invention.

FIG. 1 is a side elevational view showing a saddle-riding type vehicle according to an embodiment of the present invention. FIG. 2 is a plan view showing the saddle-riding type vehicle according to an embodiment of the present invention.

A saddle-riding type vehicle 1 is a four-wheel vehicle categorized into the ATV (all terrain vehicle). The saddle-riding type vehicle 1 includes left and right front wheels 2 and rear wheels 3, each having a relatively large diameter, disposed at the front and rear of a compact and lightweight vehicle body. The vehicle 1 has a sufficient ground clearance to enhance operational performance on rough roads.

Referring to FIG. 1, the saddle-riding type vehicle 1 has a vehicle body frame 4. The left and right front wheels 2 are suspended via a front suspension 50 on a front portion of the vehicle body frame 4. The left and right rear wheels 3 are suspended via a rear suspension 59 on a rear portion of the vehicle body frame 4.

The vehicle body frame 4 has an engine 5 (water-cooled engine) supported at a substantially center portion thereof via a plurality of engine mounts 70. A throttle body 20 is connected to a rear portion of a cylinder 7 of the engine 5. An air cleaner case 22 is connected to a rear portion of the throttle body 20 via a connecting tube 21. The throttle body 20, the connecting tube 21, and the air cleaner case 22 constitute an intake system of the engine 5. An exhaust pipe 23 is connected to a front portion of the cylinder 7 of the engine 5. Referring to FIG. 2, the exhaust pipe 23 extends forwardly of the cylinder 7 and bends to the right of the vehicle body and folds back toward the rear. The exhaust pipe 23 then extends rearwardly along the right side of the cylinder 7 and is connected to a muffler 24 disposed at a rear portion of the vehicle body. The exhaust pipe 23 and the muffler 24 constitute an exhaust system of the engine 5.

Referring to FIG. 2, a shift pedal 11, a brake pedal 12, footpegs 13, 13, and a battery 14 are provided.

Referring to FIG. 1, a radiator 25 for cooling the engine 5 is disposed forward of the engine 5. The radiator 25 is connected to the engine 5 via a rubber coolant pipe. The radiator 25 is cooled with a flow of air blown thereagainst from a forward direction of the vehicle. Coolant is supplied from the engine 5 and the coolant is returned back to the engine 5. A blower fan 25a is disposed on a back surface of the radiator 25. The blower fan 25a forces outside air to the radiator 25, so that the coolant can be cooled. A reservoir tank (not shown) for storing the coolant is disposed downward of the radiator 25. The reservoir tank is connected to the radiator 25 via the rubber coolant pipe.

The engine 5 includes a crankcase 6 and the cylinder 7. The crankcase 6 journals a crankshaft and the like. The cylinder 7 is connected on top of the crankcase 6. The crankcase 6 serves also as a transmission case accommodating therein a transmission. The crankcase 6 has an output shaft connected to the transmission inside the crankcase 6. Rotation of the output shaft is transmitted to a final gear case (not shown) in a rear portion of the vehicle body frame 4 via a chain drive mechanism not shown. The rear wheels 3 are thereby rotatably driven via a drive shaft 10 (FIG. 2) extending laterally from the final gear case.

Referring to FIG. 1, a steering shaft 27, which steers the front wheels 2, 2, a fuel tank 28, and a saddle-riding type seat 29 are disposed in that order from the front side at a center in a vehicle width direction at an upper portion of the vehicle body frame 4. A handlebar 30 is fitted to an upper end of the steering shaft 27. The handlebar 30 is disposed obliquely upwardly toward the front of the fuel tank 28. The steering shaft 27 has a lower end connected to a steering mechanism, via which the front wheels 2, 2 are steered through the handlebar 30.

The fuel tank 28 is disposed above the engine 5. Fuel in the fuel tank 28 is supplied to an injector (not shown) disposed in the throttle body 20 by way of a fuel pump not shown. The injector supplies fuel into the engine 5.

The saddle-riding type seat 29 extends longitudinally along the vehicle body. The seat 29 has a front end fixed to a tank cover 31 covering an upper portion of the fuel tank 28. The seat 29 is further fixed to the vehicle body frame 4.

The vehicle body frame 4 is fitted with a vehicle body cover 32 formed of a resin covering the vehicle body. The vehicle body cover 32 includes a top cover 35 and a pair of left and right side covers (not shown). The top cover 35 covers the front portion of the vehicle body. The side covers cover left and right parts of the front portion of the vehicle body.

In addition, the vehicle body frame 4 is fitted with a front fender 33 and a rear fender 34. The front fender 33 formed of a resin covers the two front wheels 2 from above rearwardly. The rear fender 34 formed of a resin covers the two rear wheels 3 from a forward direction thereof upwardly. The front fender 33 will be described in detail later.

Referring to FIG. 2, the vehicle body frame 4 includes a pair of left and right frame main bodies 4a, 4a and a pair of left and right sub-frames 60, 60. The frame main bodies 4a, 4a extend substantially longitudinally along the vehicle body. The sub-frames 60, 60 are connected to rear portions of the frame main bodies 4a, 4a. The frame main bodies 4a, 4a are formed from steel stock of a plurality of types (tubular pipe frames (round pipe frames)) that are welded together. Having a pair of left and right upper pipes 41, 41 and a pair of left and right lower pipes 42, 42 as main members, the frame main bodies 4a, 4a form a pair of left and right closed loop structural body. These members are joined together by a plurality of cross frames 4f, 4m, 4r, and the like to form a box structure having a longer longitudinal length at the center in the vehicle width direction.

Referring to FIGS. 1 and 2, the pair of left and right upper pipes 41, 41 includes front inclined portions 41a, 41a, intermediate portions 41b, 41b, and rear inclined portions 41c, 41c. The front inclined portions 41a, 41a extend rearwardly along the vehicle body, extending obliquely upwardly from front ends thereof and gradually widen with a mutual gap therebetween. The intermediate portions 41b, 41b extend rearwardly along the vehicle body, extend downwardly with a mild inclination from rear ends of the front inclined portions 41a, 41a and maintain a substantially constant gap therebetween. The rear inclined portions 41c, 41c extend rearwardly along the vehicle body, extend downwardly with a steep inclination from rear ends of the intermediate portions 41b, 41b and maintain a substantially constant gap therebetween. Each of these members is formed by bending a single steel pipe.

The pair of left and right sub-frames 60, 60 is connected to a boundary between the intermediate portions 41b, 41b and the rear inclined portions 41c, 41c of the upper pipes 41, 41. Each of the sub-frames 60, 60 extends rearwardly substantially horizontally before being bent downwardly in the rear of the vehicle body. The sub-frame 60 is then formed into a letter C in a side view. The sub-frame 60 then has a leading end thereof connected to each of the pair of left and right lower pipes 42, 42.

Horizontally extending portions 60a, 60a of the sub-frames 60, 60 serve also as seat rails. The abovementioned cross frame 4m, that serves also as a support member supporting a rear end of the seat 29, is disposed at the horizontally extending portions 60a, 60a.

Referring to FIG. 1, the pair of left and right lower pipes 42, 42 includes horizontal portions 42a, 42a and rear inclined portions 42b, 42b. The horizontal portions 42a, 42a extend longitudinally along the vehicle body under the upper pipes 41, 41. Connected to the front inclined portions 41a, 41a of the upper pipes 41, 41, the horizontal portions 42a, 42a extend rearwardly substantially horizontally. The rear inclined portions 42b, 42b extend obliquely upwardly from rear ends of the horizontal portions 42a, 42a. The rear inclined portions 42b, 42b have trailing ends thereof connected to the sub-frames 60, 60. Each of the lower pipes 42, 42 is formed by bending a single steel pipe.

Each of the pair of left and right sub-frames 60, 60 is connected to a boundary between each of the horizontal portions 42a, 42a and the rear inclined portions 42b, 42b of the lower pipes 42, 42 via a bracket 72. A final gear case for the rear wheels 3 is supported between the sub-frames 60, 60.

A pair of left and right rear sub-frames 44, 44 is disposed between the sub-frames 60, 60 and the rear inclined portions 42b, 42b of the lower pipes 42, 42. Upper arm support portions 64, 64, lower arm support portions 65, 65, and shock absorber support portions 66 support upper arms 61 (FIG. 2), lower arms 62 (FIG. 2), and rear shock absorbers 63 (FIG. 1) constitute the rear suspension 59 and are disposed at the rear sub-frames 44, 44 and the sub-frames 60, 60. The upper arm support portions 64, 64, the lower arm support portions 65, 65, and the shock absorber support portions 66 support the components of the rear suspension 59.

Referring to FIG. 1, a pair of left and right front frames 46, 46 is disposed between the upper pipes 41, 41 and the lower pipes 42, 42 at the front portion of the vehicle body. The front frames 46, 46 extend rearwardly along the vehicle body from points near front ends of the upper pipes 41, 41. Referring also to FIG. 1, two upper arm support portions 54, 54 having a longitudinal spacing therebetween are disposed on the front frames 46, 46. Similarly, two lower arm support portions 55, 55 having a longitudinal spacing therebetween are disposed on the horizontal portions 42a, 42a of the lower pipes 42, 42. Referring to FIG. 2, upper arms 51, 51 and lower arms 52, 52, constituting the front suspension 50, are mounted on the upper arm support portions 54, 54 and the lower arm support portions 55, 55 so as to protrude outwardly in the vehicle body width direction.

Referring to FIG. 2, the abovementioned cross frame 4f is disposed at the front inclined portions 41a, 41a of the upper pipes 41, 41 across the left and right upper pipes 41, 41. The cross frame 4f has both ends extending in the lateral direction from the upper pipes 41, 41. Upper ends of front shock absorbers 53 (see FIG. 1) support the extended portions of the cross frame 4f (hereinafter referred to as shock absorber support portions 56, 56). The front shock absorbers 53 have lower ends attached to the lower arms 62.

The front frames 46, 46 are bent at bends 46a rearward of the upper arm support portions 54, 54. Starting with the bends 46a, the front frames 46, 46 extend obliquely downwardly and are connected to the horizontal portions 42a, 42a of the lower pipes 42, 42. A pair of left and right down tubes 47, 47 (also referred to as "front upper frames"), extending downwardly from the left and right upper pipes 41, 41, is connected across the bends 46a of the front frames 46, 46 and the upper pipes 41, 41 (front inclined portions 41a, 41a). In addition, a pair of left and right front lower frames 48, 48, extending from the left and right lower pipes 42, 42, are connected across the bends 46a, 46a and the lower pipes 42, 42. The members thereby form a truss structure to enhance the frame stiffness at the front. The down tube 47 and the upper pipe 41 are joined together via a bracket 49 that is a plate member having a substantially triangular shape as shown in FIG. 1. The bracket 49 increases a joining area to thereby enhance the connection strength between the down tube 47 and the upper pipe 41.

A radiator grille 80 is fitted to the pair of left and right down tubes 47, 47. The radiator grille 80 is formed from a pair of right and left radiator grilles 80R, 80L having a shape symmetrical with each other as viewed from the front of the vehicle. More specifically, the radiator grille 80R covers the right front surface of the radiator 25, while the radiator grille 80L covers the left front surface of the radiator 25.

Figure 3:
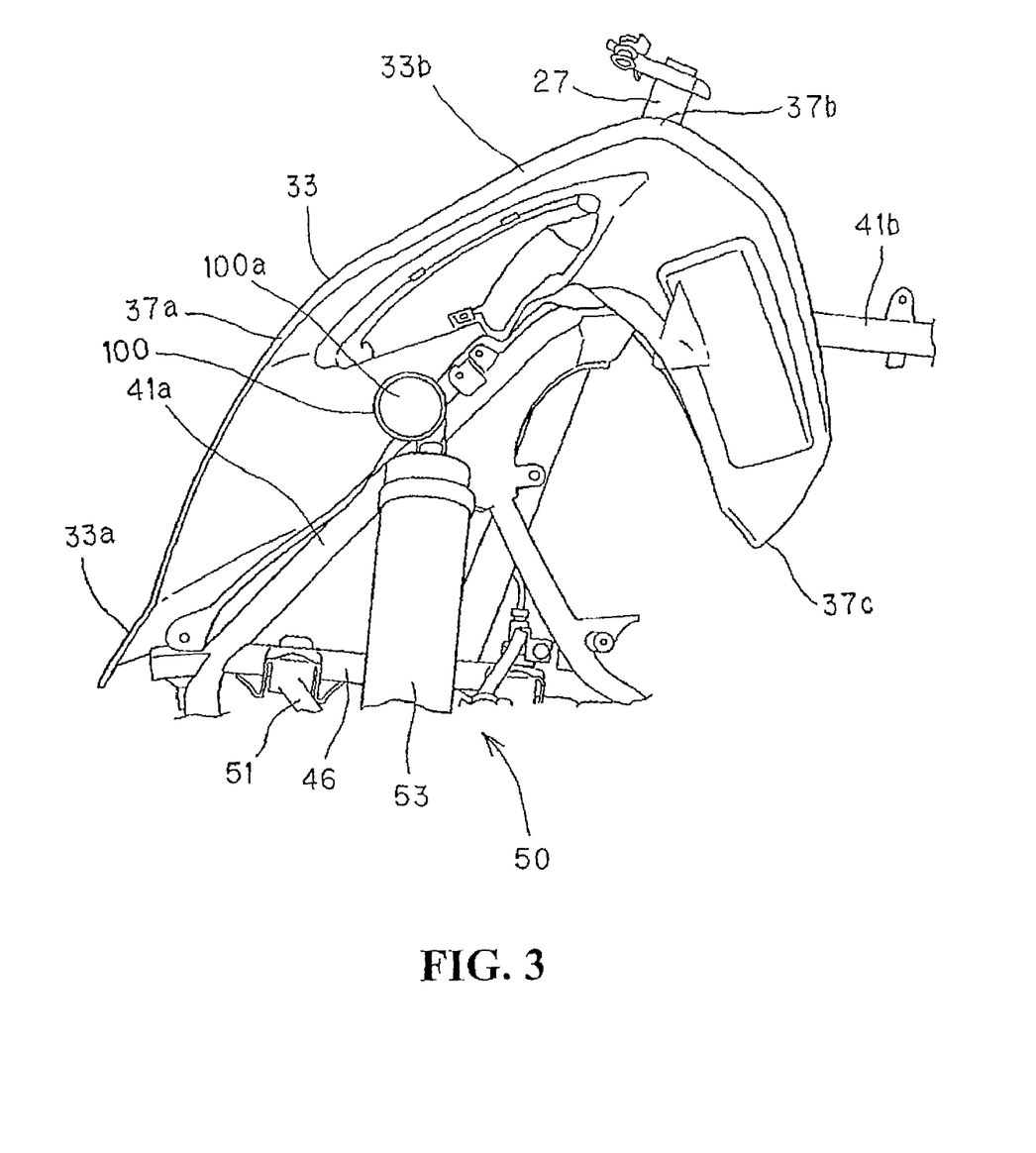
FIG. 3 is an enlarged side elevational view showing a front fender shown in FIG. 1.
Figure 4:
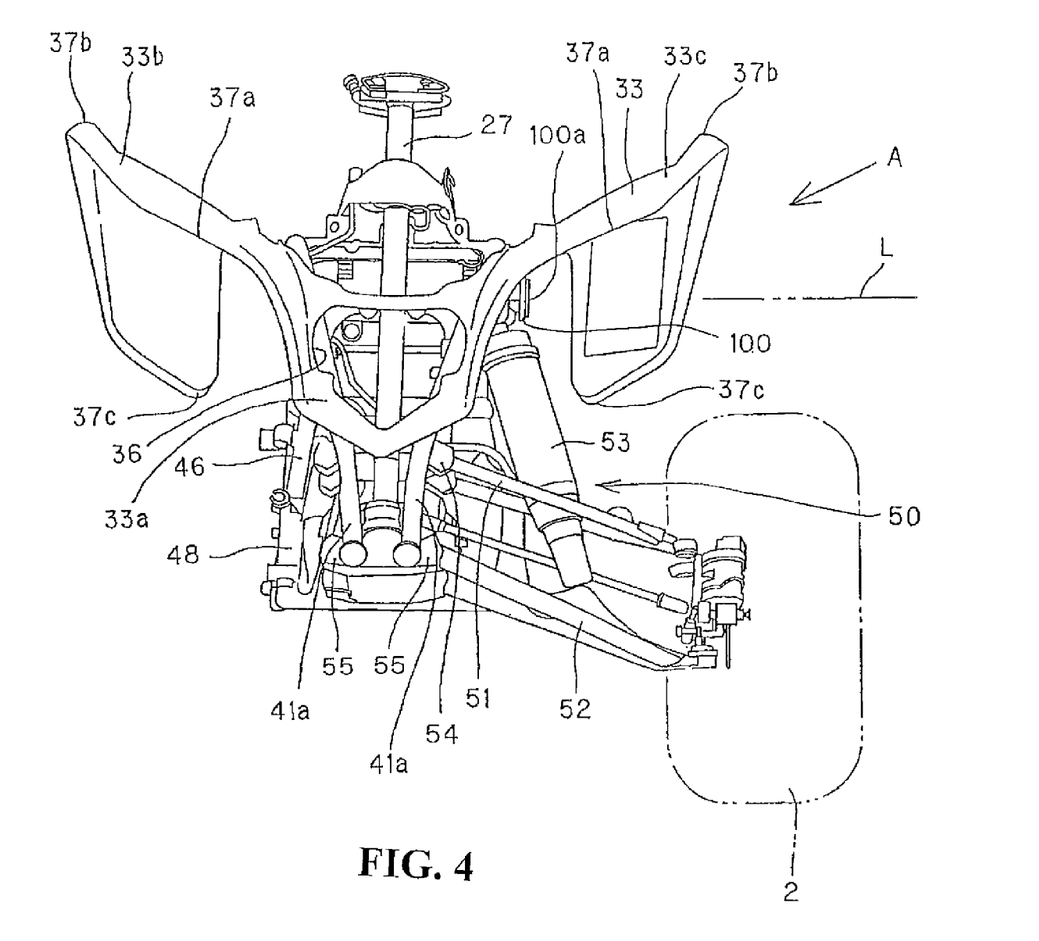
FIG. 4 is a front view showing the front fender shown in FIG. 3.
Figure 5:
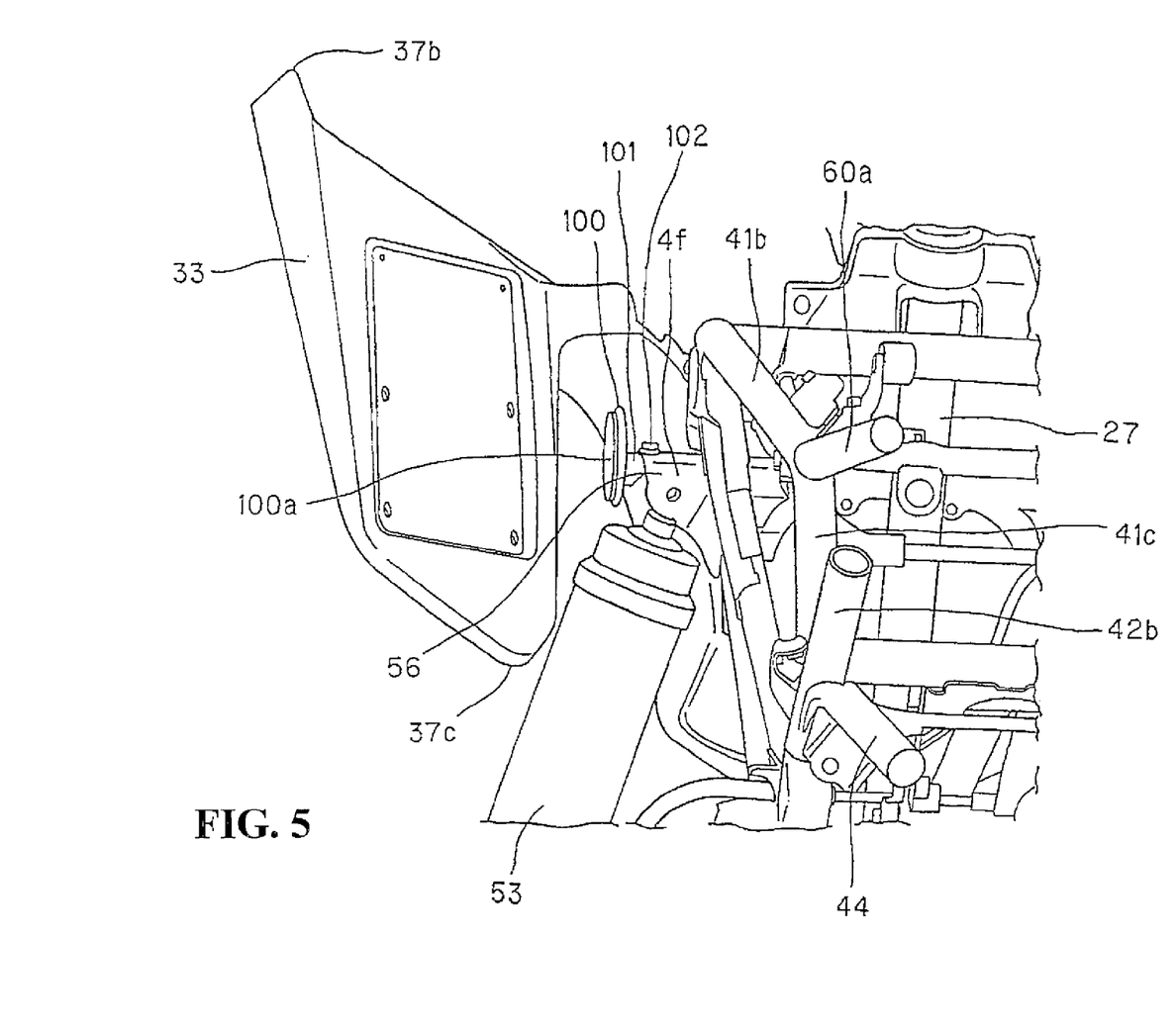
FIG. 5 is an enlarged back view showing the front fender shown in FIG. 3.

FIG. 3 is an enlarged side elevational view showing the front fender 33 shown in FIG. 1. FIG. 4 is a front view showing the front fender 33 shown in FIG. 3. FIG. 5 is a back view showing the front fender 33 shown in FIG. 3.

Referring to FIGS. 3 and 4, the front fender 33 covers the front and sides particularly, the upper portion of the front wheels 2) of the vehicle body. The front fender 33 includes a front surface 33a, a left side surface 33b, and a right side surface 33c. The front surface 33a, the left side surface 33b, and the right side surface 33c are integrally formed from a resin or the like.

Referring to FIG. 3, the front surface 33a of the front fender 33 has a streamlined shape extending from a forward obliquely downward portion to a rearward obliquely upward portion thereof so that air resistance during operation can be minimized. Referring to FIG. 4, the front surface 33a includes an opening 36 formed therein, in which a headlight not shown is fitted.

Referring to FIGS. 3 and 4, the left side surface 33b of the front fender 33 extends toward the rear of the vehicle such that an area from the rear left of the front surface 33a to the front wheel 2 is covered substantially arcuately. More specifically, the left side surface 33b is formed into a mild surface extending from the streamline shape of the front surface 33a. Referring to FIG. 3, in which the front fender 33 is viewed from the left-hand side, the left side surface 33b extends obliquely upwardly toward the rear from a front end 37a along a profile of the front wheel 2. The left side surface 33b is then inclined obliquely downwardly toward the rear from an apex 37b disposed near the steering shaft 27 toward a rear end 37c. The front end 37a is disposed so as to be higher vertically than the rear end 37c. Further, looking at the front fender 33 from the front of the vehicle, the left side surface 33b has an open front surface.

Referring to FIGS. 3 to 5, the left side surface 33b has an open side surface in a wheel width direction. Referring to FIG. 4, the left side surface 33b is inclined obliquely upwardly from an inside of the vehicle body toward an outside. When the vehicle 1 is viewed from direction A of FIG. 4 (in a horizontal or an obliquely downward direction from the outside toward the inside of the vehicle body), the foregoing configuration allows the upper end of the front shock absorber 53 (the shock absorber support portion 56) to be viewed between the front wheel 2 and the left side surface 33b.

Referring to FIGS. 3 to 5, the visible shock absorber support portion 56 is attached with a round reflector 100. The reflector 100 includes a reflection surface 100a facing toward the outside of the vehicle, so that another vehicle or a person located beside the vehicle views the reflection surface 100a of the reflector 100 to recognize that there is a vehicle even at nighttime or in dense fog.

The reflector 100 may be disposed obliquely so that it can be viewed both from forward and sideway of the vehicle. More specifically, the reflection surface 100a of the reflector 100 is disposed to orient obliquely outwardly and forwardly of the vehicle.

The reflector 100 (shock absorber support portion 56) is disposed relative to the left side surface 33b of the front fender 33 such that, when viewed from the side of the vehicle body shown in FIG. 3, the reflector 100 is disposed inwardly of the left side surface 33b. Further, when viewed from the front of the vehicle body as shown in FIG. 4, the reflector 100 is disposed downward of the front end 37a of the front fender 33 and outside in the vehicle body width direction of the front surface 33a of the front fender 33. Accordingly, the reflector 100 can be viewed from the outside of the vehicle body over a range from the front of the vehicle body to the side of the front wheel 2.

The reflector 100 (shock absorber support portion 56) is disposed relative to the front wheel 2 such that, referring to FIG. 4, the reflector 100 is higher than the front wheel 2 (located when the front suspension 50 does not function). When the front suspension 50 functions to move the front wheel 2 upward, an upper end of the front wheel 2 reaches a line indicated by reference numeral L in FIG. 4. The reflector 100 is disposed so as to be visible through a space between the front wheel 2 and the left side surface 33b of the front fender 33 (view on arrow A in FIG. 4). More specifically, the reflector 100 is disposed upward of a movable range of the front wheel 2.

In addition, referring to FIG. 4, the reflector 100 is disposed inward of the front wheel 2. Accordingly, disposing the reflector 100 in a position deviated in the width direction relative to the front wheel 2, it is less likely that the reflector 100 will be soiled with water and mud splashed by the front wheel 2 during operation. It is to be noted that water and mud splashed by the front wheel 2 are concentrated on an area near the rear end 37c of the front fender 33. The reflector 100 is disposed at a position circumventing this area and substantially upward of a center of the front wheel 2 (axle).

The right side surface 33c of the front fender 33 and a right-hand side reflector 100 are disposed so as to be symmetrical with respect to the left side surface 33b as viewed from the front of the vehicle body. Detailed descriptions of the right-hand side will therefore be omitted.

Figure 6:
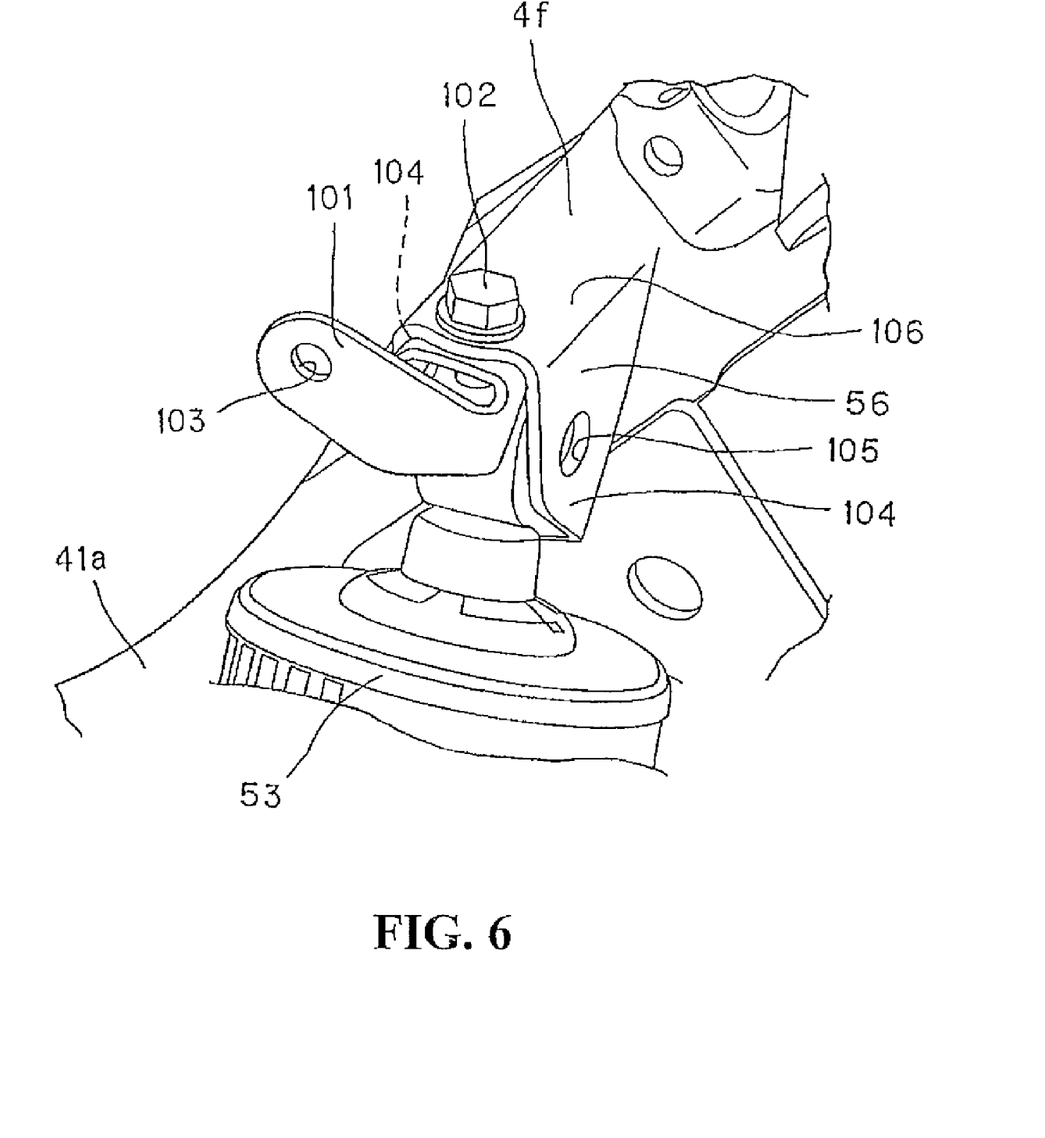
FIG. 6 is an enlarged perspective view showing an upper end mounting portion of a front shock absorber.

FIG. 6 is an enlarged perspective view showing an upper end mounting portion of the front shock absorber 53, or a mounting portion of the reflector 100.

Either end of the cross frame 4f in the shock absorber support portion 56 has a cross section substantially C-shaped to be open downwardly. Side surfaces 104, 104 disposed in the longitudinal direction of the cross frame 4f include mounting holes 105, 105 formed therein. The upper end of the front shock absorber 53 is inserted from a lower side of the C shape into an inside of the C shape at either end of the cross frame 4f. A bolt or the like not shown is inserted and threaded through the mounting holes 105, 105 to join the cross frame 4f to the front shock absorber 53.

A reflector mounting bracket 101 for mounting the reflector 100 on the vehicle body is disposed at each leading end of the two ends of the cross frame 4f. The reflector mounting bracket 101 is attached by inserting and threading a bolt 102 from above into a mounting hole (not shown) formed in an upper surface 106 of the cross frame 4f. The reflector mounting bracket 101 includes a reflector mounting surface 101a that extends toward the outside of the vehicle body from either end of the cross frame 4f and is bent forwardly of the vehicle body. The reflector mounting surface 101a includes a reflector mounting hole 103 formed therein. A bolt not shown is inserted into this reflector mounting hole 103 to attach the reflector 100 (not shown in FIG. 6) in place.

In the reflector mounting structure according to the embodiment of the present invention, the reflector 100 is disposed on the inside of the side surface 33b, 33c of the front fender 33. This arrangement allows the reflector 100 to be less noticeable as compared with an arrangement in which the reflector 100 is disposed on the outside of the vehicle body. This enhances the appearance of the vehicle 1.

With respect to the front wheel 2, the reflector 100 is disposed upward of the movable range of the front wheel 2. This allows the reflector 100 to be visible from the outside of the vehicle body even while the vehicle 1 is operating.

In addition, the shock absorber support portion 56 is disposed on the inside of the side surfaces 33b, 33c of the front fender 33 and the reflector 100 is mounted on the shock absorber support portion 56 via the reflector mounting bracket 101. This allows the reflector 100 to be disposed easily.

Further, the reflector mounting bracket 101 is threadably attached at the leading end of the cross frame 4f using a bolt threaded from a direction (vertical) that is different from the bolt insertion direction (longitudinal) for the front shock absorber 53. This allows the reflector 100 to be disposed near the leading end of the cross frame 4f.

The side surfaces 33b, 33c of the front fender 33 have side surfaces open in the width direction of the front wheels 2. This enhances visibility of the reflector 100 from the outside on both sides of the vehicle body.

Further, the reflector 100 is disposed downward of the front ends 37a of the side surfaces 33b, 33c covering the upward sides of the front wheels 2. This opens the front surfaces of the front wheels 2 in the longitudinal direction. Accordingly, the reflector 100 can be viewed from the front of the vehicle. More specifically, the reflector 100 can be viewed from the outside of the vehicle body over a range from the front of the vehicle body to the sides of the front wheels 2.

The present invention has been described in detail with particular reference to the foregoing preferred embodiment thereof, but it will be understood that variations and modifications can be effected within the spirit and scope of the invention.

For example, in the foregoing illustrative embodiment of the present invention, the reflector 100 is disposed on the inside of the front fender 33. The reflector 100 may similarly be disposed on the inside of the rear fender 34. This allows the reflector 100 to be disposed also in the rear of the vehicle and to be mounted on the vehicle without degrading the appearance in the rear of the vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle comprising:
a wheel disposed on a vehicle body frame via a suspension;
a fender covering an area above the wheel;
a cross frame disposed on a lower side of the fender, the cross frame extending laterally in a lateral direction of the vehicle body frame and across the vehicle body frame and having two opposite ends in the lateral direction of the vehicle body frame;
a shock absorber having an upper end attached to the cross frame; and
a reflector disposed visibly from an outside of the vehicle and located on one of the two opposite ends of the cross frame.

2. The vehicle according to claim 1, wherein the fender has a side surface open in a wheel width direction such that the reflector is visible from the outside of the vehicle.

3. The vehicle according to claim 1, wherein the fender has a front surface open in a wheel longitudinal direction such that the reflector is visible from the outside of the vehicle.

4. The vehicle according to claim 1, wherein another reflector is located on the other one of the two opposite ends of the cross frame.

5. The vehicle according to claim 1, wherein the fender includes a streamlined shape extending from a forward obliquely downward portion to a rearward obliquely upward portion wherein air resistance during operation is minimized.

6. The vehicle according to claim 5, wherein the fender includes a front end disposed to be higher vertically than a rear end thereof.

7. The vehicle according to claim 1, wherein the reflector is arranged to be visible from a lateral side of the vehicle.

8. The vehicle according to claim 1, wherein the reflector is disposed obliquely and is arranged to be visible from a front and a lateral side of the vehicle.

9. The vehicle according to claim 1, wherein the reflector is disposed at a position above the wheel of the vehicle.

10. The vehicle according to claim 1, wherein the reflector is located directly above the shock absorber.

* * * * *